April 24, 1934.    O. M. GLUNT ET AL    1,955,801
SOUND PICTURE PROJECTOR
Filed Dec. 10, 1929    2 Sheets-Sheet 1
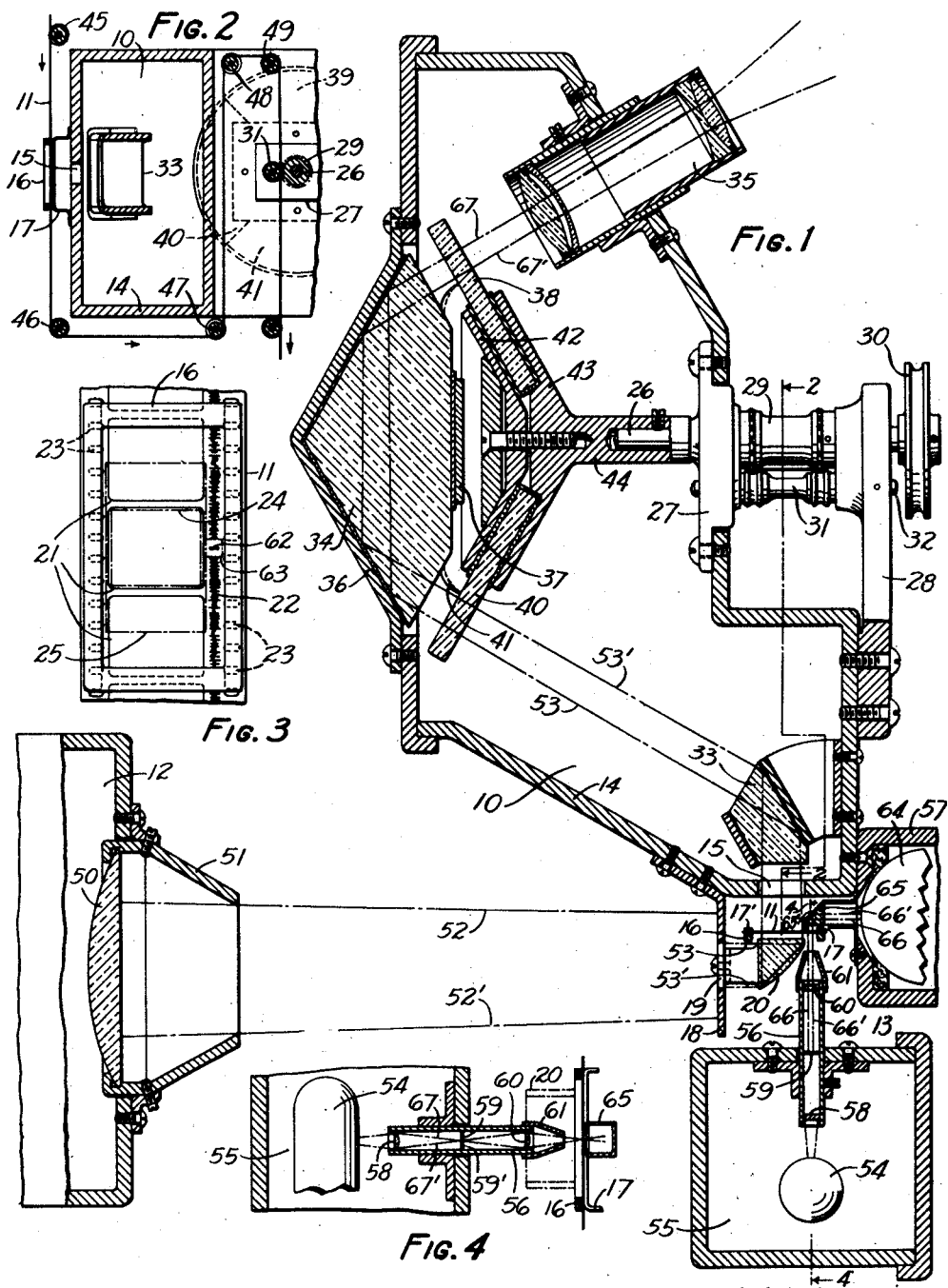
INVENTORS O. M. GLUNT
E. W. GENT
BY
G. H. Stevenson
ATTORNEY Patented Apr. 24, 1934

1,955,801

UNITED STATES PATENT OFFICE 1,955,801

SOUND PICTURE PROJECTOR

Omer M. Glunt, Rutherford, and Edgar W. Gent, Morristown, N. J., assignors to Bell Telephone Laboratories, Incorporated, New York, N. Y., a corporation of New York Application December 10, 1929, Serial No. 412,957

1 Claim. (Cl. 88—16.2)

This invention relates to sound picture systems and particularly to projector systems adapted to use a film incorporating both picture areas and sound records.

Due to the narrow film used in known film sound picture systems, only one sound record is used and this record is generally located along one edge of the film near the sprocket holes. A wider film with space for two sound records will have many advantages over the present film. Thus, the dialogue between the principal characters in a scene may form one record, while the second record is used for incidental music or stage effects to accompany the dialogue, or, the space may be used to record a varied or interrupted current which may control the volume of the reproduced sound, as disclosed in U. S. Patent 1,623,756, April 5, 1927, C. F. Sacia, the speed of the motors the apparent location of the source of sound or similar function.

In the present systems of motion picture projection, the film is given an intermittent motion past the picture projecting device so that for some portion of the cycle of operation the film is stopped and the picture is stationary on the screen. The sound record on the film must always pass the sound reproducing device at a uniform speed; thus a loop of film is generally formed between the picture projecting device and the sound reproducing device. In order to permit the formation of loop between the picture and its corresponding sound record without destroying the synchronism between them, the sound record or records are displaced lengthwise of the film from the picture being projected. When a sound picture film having two sound records is used, a separate reproducer may be used for each record, or a common reproducer for both records. The reproducers may be located with both reproducers above or both reproducers below, or one above and one below the picture projecting device. When separate reproducers are used located at different points on the film, the sound records will be displaced with respect to each other and to the picture.

However, when the sound records are displaced lengthwise of the film from their corresponding picture, the problem of editing or patching a film is complicated by the irregular cut required and unless special precautions are taken, the synchronism between picture and sound will be affected.

In accordance with this invention the difficulty is avoided by locating the point of reproduction of the sound in line laterally of the film with the optical center of the picture being projected. As the motion of the film at the point of reproduction of the sound must be uniform, this invention contemplates the use of a continuous type motion picture projector in combination with a sound reproducer, or reproducers, operating on adjacent portions of the film.

A feature of the invention is an arrangement whereby the optical system of the sound reproducer is brought into close juxtaposition with the optical system of the picture projector while at the same time stray light from either system is prevented entering the other.

A further feature of the invention is an arrangement whereby an optical sound reproducer having a common exciting lamp and separate light sensitive devices for reproducing two sound records is brought into close juxtaposition with the optical system of a picture projector while at the same time stray light from any of the optical systems is prevented from entering any of the other optical systems.

The invention will be better understood from the following description, with reference to the accompanying drawings in which Fig. 1 is a sectional view of a sound picture projecting system embodying the invention;

Fig. 2 is a front elevation, partly in section showing in greater detail a portion of the projector in Fig. 1;

Fig. 3 is an illustration of a film, showing the relative locations of the picture gate and the image of the light slit of the reproducer;

Fig. 4 is a sectional elevation of the optical reproducer;

Figure 5:
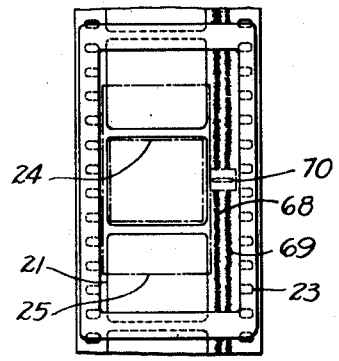
Fig. 5 is an illustration of a film having two sound records and showing the relative locations of the picture gate and the image of the light slit of the reproducer.

The drawings illustrate a sound picture projecting system which comprises a picture projector head 10, a film 11 containing the sequence of pictures and a sound track, a lamphouse 12 for casting a light beam through the picture into the projector head, and an optical sound reproducer 13 for operating upon the sound track of the film. The projector head and its relation to the film will be described with reference to the sectional plan view in Fig. 1, with the aid of Fig. 2 which is a fragmentary elevation view of a section through 2, 2, and of Fig. 3, which illustrates the portion of the film at the film gate. The projector head comprises a housing 14 having a picture aperture 15 in front of which is mounted a film gate composed of a pressure foot 16 and film guides 17 and 17' between which the film is run. An aperture plate 18, provided with a picture framing aperture 19, is suitably attached to the housing in such a position that light from the lamphouse passes through it and is deflected through the pictures on the film by a lens prism 20 located directly in front of the picture gate and mounted on the aperture plate.

Fig. 3 illustrates the film 11 and the pressure foot 16 and shows more in detail the position of the film relative to the associated apparatus. There are shown on the film the picture frames represented by rectangles 21, the sound track 22 of which the uneven lines represent the fluctuations of pitch and intensity of the sound, and uniformly spaced perforations 23 in the margins for engaging with the driving mechanism. The projection of the picture light on the film is represented by a rectangle 24. A rectangle 25 denotes the projected position of the lens prism 20.

The projector head contains the film driving mechanism and the optical picture projecting system. The driving mechanism comprises a main drive shaft 26 which extends through the housing and is held in position by bearing plates 27 and 28 attached to the housing. Fixed to the drive shaft, outside the housing, are a film sprocket wheel 29 and a driving pulley 30. Prongs on the sprocket for engaging the perforations of the film, also engage corresponding depressions in an idler 31 on an auxiliary shaft 32. The optical system includes a prism 33 fastened inside the housing directly behind the picture aperture 15, a second prism 34 centrally located with respect to the axis of the shaft, an objective 35 and a system of refracting plates attached to the drive shaft. The prism 34, which presents plane surfaces to the light beam entering and leaving, is held in a pocket 36 by a band 37 which is fastened to the pocket. The refracting system comprises four plane glass plates 38, 39, 40 and 41, suitably clamped edge to edge between two spiders 42 and 43, the latter of which is provided with a hub 44 which is fastened over the end of the main driving shaft 26.

Fig. 2 illustrates the motion of the film relative to that of the refracting plates. The film is run between the sprocket and idler and is continuously pulled through the film gate by a uniform counter-clockwise rotation of the sprocket, the film being guided in the course by rollers 45, 46, 47, 48 and 49, which may be attached to the projector head housing.

The lamphouse 12, of which the anterior portion comprising a condensing lens 50 and a hood 51 is shown, may be of any suitable type and mounted in a manner well understood in the art. The boundaries of the light beam which is directed upon the aperture plate are indicated by projection lines 52 and 52'. The boundaries of the beam formed by the picture framing aperture are shown by projection lines 53 and 53'.

The sound reproducing system 13 comprises a suitable lighting lamp 54 situated in a lamphouse 55, a lens tube 56 and a photoelectric cell 57. The sound reproducer is illustrated also by Fig. 4, which is an elevation of a section taken through 4, 4. The lens tube, which extends outward from the lamphouse 55, contains a condensing lens 58, a narrow horizontal slit formed by knife-edges 59 and 59', an objective lens 60 and a hood 61 placed over the front end to prevent the dispersion of light. The lenses 58 and 60 are preferably of the cylindrical type arranged in the tube with the cylindrical axis parallel to the slit so that the light beam is narrowed down without its breadth being decreased. The width of the image of the slit is commonly made .001 inch and the breadth .08 inch, which is slightly less than the breadth of the sound track. The lens tube assembly may be mounted in any convenient manner on the carriage, or base, of the apparatus, but it should be so mounted that its principal axis is perpendicular to the plane of the film and passes through the center of the sound track. Furthermore, the optical axis of the lens tube is placed on a level with that of the picture framing aperture 19 in juxtaposition with the picture lens prism 20, as shown in Fig. 4, so that the image of the slit is focused on the film track adjacent the picture which is being framed. The position of the slit image on the film relative to the picture is illustrated in Fig. 3 in which the image of the slit is represented by a line 62 while the projected position of the opening of the hood 61 is represented by a rectangle 63.

The photoelectric cell housing 57 containing a photoelectric cell 64, is fastened to the projector housing adjacent its picture aperture. Attached to the cell housing and located directly behind the sound track is a lens prism 65 in such a position that light from the sound track is reflected to the photoelectric element. The housing 65' supporting the prism 65 is brought forward very close to the film 11 and carried back to the housing 57 so as to inclose the prism 65 and prevent light modulated by the picture areas from affecting the photoelectric cell 64. The projection lines 66 and 66' indicate the breadth of the light beam in its passage from the slit to the photoelectric element. The projection lines 67 and 67' in Fig. 4 indicate the focal points of the light from the lamp; from this it can be seen that the condenser lens 58 focuses approximately on the slit while the objective lens 60 focuses on the film.

Figure 6:
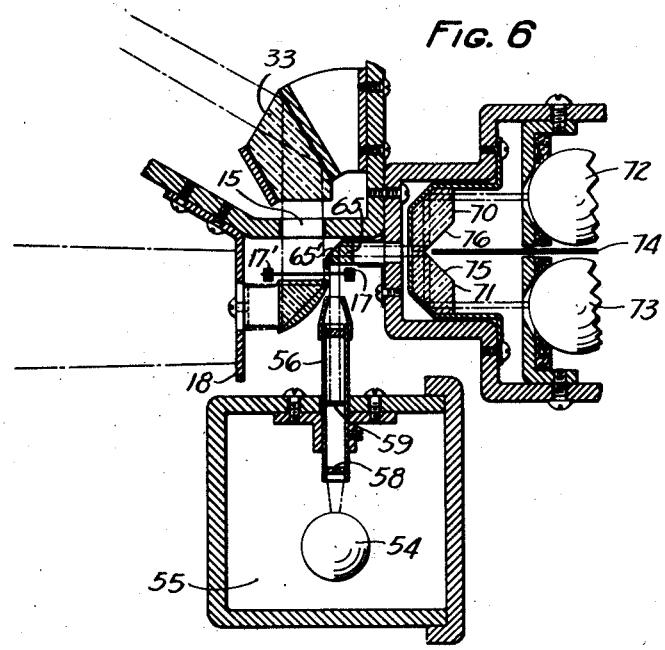
Fig. 6 is a sectional view of a sound reproducer for two sound records.

When a film carrying two sound records is used, the sound reproducing system may be conveniently modified to the arrangement shown in Fig. 6. The optical system for illuminating the two sound records is essentially the same as shown in Fig. 1 except that the length of the image 70 of the slit must be increased to span both sound records 68 and 69, as shown in Fig. 5. After deflection by prism 65, the modulated light rays from the two sound records 68 and 69 are separated by the prisms 70 and 71 and deflected to their respective photoelectric cells 72 and 73. The sloping faces 75 and 76 of the prisms 70 and 71 may be coated with some opaque substance. This coating, assisted by the barrier 74 will prevent stray light from one sound record affecting the photoelectric cell associated with the other record. It will be obvious that separate exciting lamps may be used though considerations of the space available may necessitate the sound records being displaced lengthwise of the film from each other.

Although the picture aperture plate and the optical reproducer have, for the sake of simplicity, been described as fixed to the picture projector head, in most systems the aperture plate is adjustable upward and downward to facilitate "framing". In such an arrangement it would be necessary to fix the optical reproducer to the carriage upon which the aperture plate is mounted in order to maintain the optical axis of the sound reproducer and of the picture projector at the same level in all positions of the aperture plate.

The operation of the picture projector is briefly as follows: The drive shaft is rotated at constant speed in a counter-clockwise direction by the pulley which is belted to a motor. The number of prongs on the sprocket are such that for every complete revolution of the shaft, four picture frames travel downward past the film gate; that is, corresponding to the passage of each frame there is the passage of one of the refracting plates through the beam incident upon lens 34 and one through the beam reflected from the lens. The thickness of the refracting plates and their angle to the shaft are such that there is always furnished the proper amount of refraction to keep the image on the screen stationary while the picture on the film is moving downward. The angular positions of the plates on the shaft are so related to the picture frames that a plate and its corresponding picture frame enter and leave the field of light together. The optical relations necessary for the attainment of this result are described in the article "A new optical compensator" by J. F. Leventhal, on page 1068, Vol. XII, Number 36 of the Transactions of the Society of Motion Picture Engineers. To prevent the projection on the screen of light passing through the space between successive picture frames, provision should be made for blocking it off. This may be accomplished by a properly arranged shutter, or perhaps more conveniently by strips of opaque material of the proper dimensions cemented along the leading edges of the refracting plates.

The film used in this system of projection is so printed from the negatives that the frames and portions of film track which are to be projected simultaneously, are located adjacent each other. This formation of the film obviously facilitates cutting out and patching of the film, for the cuts are made straight across the film. While a continuous motion picture projector is necessary, the particular mechanism herein described for the picture projection is not essential to the invention, other types of continuous projectors being equally suitable. The invention resides, rather, in the film arrangement and in the combination of the picture projecting and the sound reproducing systems as indicated by the appended claim.

What is claimed is:

In combination, a projection lamp, a picture film having a photographic record, a continuous motion projector, optical means in said projector for directing light from said projection lamp through said picture film, an exciting lamp, a lens tube directing light from said exciting lamp to an area of said record laterally aligned with said illumined picture, a light sensitive device, an optical prism for deflecting light modulated by said record out of said projector to said light sensitive device, and a shield supporting said prism, one edge of said shield approaching close to said film between said picture and said record and the other edge of said shield being adjacent to said light sensitive device.

OMER M. GLUNT.
EDGAR W. GENT.